US008391817B2

(12) United States Patent
Noel

(10) Patent No.: US 8,391,817 B2
(45) Date of Patent: Mar. 5, 2013

(54) METHOD OF AND SYSTEM FOR TUNING AN ANTENNA

(75) Inventor: Denis Noel, Grez-Doiceau (BE)

(73) Assignee: NXP B.V., Eindhoven (NL)

( * ) Notice: Subject to any disclaimer, the term of this patent is extended or adjusted under 35 U.S.C. 154(b) by 190 days.

(21) Appl. No.: 13/001,568

(22) PCT Filed: May 19, 2009

(86) PCT No.: PCT/IB2009/052071

§ 371 (c)(1),
(2), (4) Date: Dec. 27, 2010

(87) PCT Pub. No.: WO2009/156879

PCT Pub. Date: Dec. 30, 2009

(65) Prior Publication Data

US 2011/0111706 A1 May 12, 2011

(30) Foreign Application Priority Data

Jun. 27, 2008 (EP) .................................... 08104565

(51) Int. Cl.
*H04B 1/18* (2006.01)
*H04K 3/00* (2006.01)

(52) U.S. Cl. ................................ 455/193.1; 455/226.1

(58) Field of Classification Search .... 455/193.1–193.3, 455/226.2
See application file for complete search history.

(56) References Cited

U.S. PATENT DOCUMENTS

| | | | | |
|---|---|---|---|---|
| 5,374,930 | A | 12/1994 | Schuermann | |
| 5,550,536 | A | 8/1996 | Flaxl | |
| 5,745,844 | A | 4/1998 | Kromer et al. | |
| 7,058,372 | B1 | 6/2006 | Pardoen et al. | |
| 7,113,139 | B2 | 9/2006 | Charrat | |
| 2008/0268803 | A1 * | 10/2008 | Blin | 455/193.1 |

FOREIGN PATENT DOCUMENTS

| | | | |
|---|---|---|---|
| EP | 1 387 313 | B1 | 9/2006 |
| EP | 1 857 960 | A2 | 11/2007 |
| GB | 2 350 502 | A | 11/2000 |
| WO | 97/15164 | A2 | 4/1997 |
| WO | 00/41355 | A1 | 7/2000 |
| WO | 2007/129260 | A2 | 11/2007 |

OTHER PUBLICATIONS

Finkenzeller, et al, "RFID_Handbuch", RFID Handbook, Grundlagen Und Praktische Anwendungen, pp. 203-224 (Sep. 26, 2002).

International Search Report and Written Opinion for Int'l. Patent Appln. No. PCT/IB2009/052071 (Jul. 20, 2009).

* cited by examiner

*Primary Examiner* — Lee Nguyen

(57) ABSTRACT

A method of tuning an antenna is provided, wherein the method comprises receiving a first signal strength indicator indicating a signal strength of a first data signal transmitted by an antenna on a first frequency, receiving a second signal strength indicator indicating a signal strength of a second data signal transmitted by the antenna on a second frequency different to the first frequency, determining a tuning control signal based on the first signal strength indicator and the second signal strength indicator, and tuning the antenna based on the control signal.

19 Claims, 4 Drawing Sheets

METHOD OF AND SYSTEM FOR TUNING AN ANTENNA

FIELD OF THE INVENTION

The invention relates to a method of tuning an antenna, in particular to a method of dynamically tuning an antenna of a transceiver.

Beyond this, the invention relates a system for tuning an antenna.

Furthermore, the invention relates to a program element.

Moreover, the invention relates to a computer-readable medium.

BACKGROUND OF THE INVENTION

Antennas are used in a wide range of devices nowadays, in particular wireless communication devices. Antennas are basically transducers converting electromagnetic fields into electric current and voltages and vice-versa. Among these antennas, some reacts dominantly on the magnetic field. This is the case of loop antennas, made of a coil that is usually put in resonance using capacitors.

The antenna features a certain resonance frequency and bandwidth. These systems are based on resonant RLC circuits: the bandwidth of the antenna can be adjusted using resistive elements (R) while the resonance frequency can be adjusted using capacitors (C).

A particular case of devices using magnetic antennas are so-called smart cards with integrated loops. Another technical field in which this kind of antennas may be used is the field of hearing aids.

The above mentionned systems rely on the usually called “Magnetic Induction in Near Field” technology, which is based on the quasi-static magnetic component of the field generated by a coil through which is flowing a sinusoidal current. This is the well-known transformer principle extensively used for a long time, i.e. when a second coil (at the receiver side) is introduced within that field, the magnetic flux passing through that coil induces a modulated current in the winding.

The field generated by a current loop (magnetic dipole) can actually be divided into three basic components: one inverse distance term proportional to $r^{-1}$, which is called the radiation term, since this term represents the flow of energy away from coil, one inverse square distance term proportional to $r^{-2}$, and finally one inverse cube distance term proportional to $r^{-3}$ which is called the quasi-stationary term.

There are terms in both $1/r$ and $1/r^2$ which radiate, that is to say they have matching pairs of E and B vectors orthogonal to each other and to the radial vector. The “far field” is however usually considered to include only the $1/r$ terms, since they dominate at distances much greater that the wavelength.

At short distance from the current loop, the $1/r^3$ term (near-filed) dominates and is the major contributor. This $1/r^3$ term in the B field is independent of frequency, which implies that any frequency can be employed in the near-field domain, for a given coil and current, to generate a specified magnetic field at the receiver. In the near-field region of a current loop, the field properties are primarily determined by the source characteristics, and the electric field is much weaker than the magnetic field.

The total power radiated by the loop antenna is however frequency dependent and proportional to $\lambda^2$, wherein $\lambda$ is the respective wavelength, such that at a frequency dependent distance of $\lambda/2\pi$, the three basic terms in $1/r$, $1/r^2$ and $1/r^3$ equally contribute to the total field. This distance is often referred to as the near field—far field boundary. Other definitions of this boundary exist, depending on the perspective and primarily on the characteristics of the medium through which the field is the criterion used to define it: wave impedance, wave’s phase front, etc.

At distances larger than $\lambda/2\pi$, the far-field components dominate, the electric and magnetic fields are directly proportional to one another, and the properties of the field depend primarily on the characteristics of the medium through which the field is propagating.

The frequency response of the antennas may vary significantly due to temperature variations, component spreading, e.g. coil and capacitance value tolerances and nature of material constituing the surrounding environment of the antenna. Also it may be required to align the resonance frequency of the antenna to different carrier frequency to cover different RF frequency bands or to align the antenna resonant frequency on a changing carrier frequency, e.g. due to temperature or aging effects, or due to a bad carrier frequency accuracy.

OBJECT AND SUMMARY OF THE INVENTION

It may be an object of the invention to provide a method of and a system for tuning an antenna, which may enable a dynamically tuning of the antenna not only at system manufacturing but also during the lifetime of the system.

In order to achieve the object defined above, a method of tuning an antenna, a system for tuning an antenna, a program element, and a computer-readable medium according the independent claims are provided. Advantageous embodiments are described in the dependent claims.

According to an exemplary aspect a method of tuning an antenna is provided, wherein the method comprises receiving a first signal strength indicator indicating a signal strength of a first data signal transmitted by an antenna on a first frequency, receiving a second signal strength indicator indicating a signal strength of a second data signal transmitted by the antenna on a second frequency different to the first frequency, determining a tuning control signal based on the first signal strength indicator and the second signal strength indicator, and tuning the antenna based on the control signal.

In particular, the antenna may be an antenna of a transceiver. For example, the method may be performed on a receiving side of a communication link and/or on the transmitting side of the communication link. Furthermore, the first data signal and the second data signal may be the same or may be different data signals. In particular, the first frequency may correspond to a lower FSK tone (Frequency Shift Keying) while the second frequency may correspond to an upper FSK tone. Thus, two tones may be provided, wherein each tone may be generated by a different Phase Locked Loop (PLL), the output of which may be selected at the right moment, e.g. at a zero crossing of the signal, and depending on bit to transmit. Of course more than two tones/frequencies may be used in order to determine the control signal, e.g. a third PLL generating the carrier frequency may also be used. For example, the first and second data signals may be generated by a device the antenna is part thereof or may be generated by another device and may be received by the antenna. In particular, the first and second data signals may be generated or received concurrently or may be generated or received sequentially. In particular, the data signal the strength of which is measured may be a received signal conveying information and the frequency thereof may be determined after received symbol estimation according to a decision feedback mechanism. Alternatively, the data signal the strength of which is measured may be a transmitted signal conveying information and the frequency thereof may be determined by the symbol value conveying the information bits. Furthermore, the method may be continuously repeated so that an optimal tuning may be ensured at any time.

It may also be possible to use a broadband signal instead of the two tones, since such a broadband signal comprises even more than two tones. That is, a broadband signal may provide a tuning signal, which may as well be used, e.g. a short broadband pulse may be used in order to achieve at least two signal strength indicators. Preferably, in that case an FFT may be performed on the respective antenna signal based on which the control signal may be determined. In case of a short pulse, i.e. of a broadband pulse, it may be advantageous to use a sequentially generation or receiving of the data signals.

In particular, the data signal may be a specific signal, e.g. a signal prepared for enabling the method, or may be a "normal" information signal, i.e. a signal that is used to convey information from a transmitter to a receiver.

Furthermore, it should be noted that the tuning may be a frequency tuning and/or a quality factor tuning or bandwidth tuning. In all cases the tuning may be based on the control signal, which may be different for the different tuning types. In case of the quality tuning it may be preferred to measure the strengths of two specific data signal as well as of a carrier the two specific data signals are mixed onto. That is, a third signal strength indicator may be used for determining the control signal.

According to an exemplary aspect a system for tuning an antenna is provided, wherein the system comprises a transducer which comprises a receiving terminal, adapted to receive a first signal strength indicator indicating a signal strength of a first data signal transmitted by an antenna on a first frequency, and further adapted to receive a second signal strength indicator indicating a signal strength of a second data signal transmitted by the antenna on a second frequency different to the first frequency, a determining unit adapted to determine a tuning control signal based on the first signal strength indicator and the second signal strength indicator, and a tuning unit adapted to tune the antenna based on the control signal. The receiving terminal or receiving unit may be a terminal at which a signal can be input into the transceiver. It should be noted that such a receiving terminal is distinct to a receiver of a communication link comprising a transmitter and a receiver. In particular, the transducer, also called transceiver in this application, may comprise a transmitter and a receiver or may only be formed by one of the both units, i.e. may be formed by a single transmitter or a single receiver. Thus, the term "transducer" may particularly be used as a generic term for a transmitting unit or a receiving unit and may not necessarily need to have both functionalities implemented.

According to an exemplary aspect a program element is provided, which, when being executed by a processor, is adapted to control or carry out a method according to an exemplary aspect.

According to an exemplary aspect a computer-readable medium is provided, in which a computer program is stored which, when being executed by a processor, is adapted to control or carry out a method according to an exemplary aspect.

The method of tuning an antenna according to embodiments of the invention can be realized by a computer program, that is, by software, or by using one or more special electronic optimization circuits, that is in hardware, or in hybrid form, that is by means of software components and hardware components.

By providing a method according to an exemplary aspect of the invention a dynamic tuning of the antenna may be enabled, not only at system/device manufacturing time, but also regularly during the life of the product. In the particular case of fast changing antenna response, a tuning may be possible at each start-up of the system/device, or even during the usage of system/device to avoid regular loss of performances.

By using two frequencies it may be possible to perform a fast tuning of the resonant frequencies, since no sweeping of all possible capacity values may be necessary. Furthermore, it may be possible to implement the system or device for tuning an antenna without an additionally circuitry of a phase detector.

It may be seen as a gist of an exemplary aspect of the invention that at least two signal strength indicators are received which are used to determine a control signal which may be used for tuning an antenna. The two signal strength indicators correspond to two different frequencies. The principle of the exemplary aspect of the invention may rely on the fact that each transmitted/received symbol lead to different power, voltage or current spectral signature on the antenna in such a way that the antenna response is different according the transmitted/received symbol.

Next, further exemplary embodiments of the method of tuning an antenna are described. However, these embodiments also apply to the system for tuning an antenna, the program element, and the computer-readable medium.

According to another exemplary embodiment of the method the control signal is based on a difference between the first signal strength indicator and the second signal strength indicator. Ideally this difference is 0 while optimally tuned, while a negative or positive difference indicates a resonant frequency which is too high or too low. In particular, depending on the calculation of the difference, it may be possible to deduct the direction of the necessary shift by the algebraic sign of the difference. For example, in case the difference is calculated by subtracting the signal strength indicator corresponding to the higher frequency from the signal strength indicator of the lower frequency, a negative difference indicates that the resonant frequency is too high, while a positive difference indicates that the resonant frequency is too low.

According to another exemplary embodiment the method further comprises measuring the first signal strength indicator, and measuring the second signal strength indicator.

In particular, a level detector may be used to measure the signal strength indicators, e.g. a level detector which may also be used for other purposes, for example for detecting the presence of a signal when the system/device is in sleep mode in order to wake up the sleeping device. Furthermore, a plurality of measurements may be performed for each signal strength indicator. In case more than one measurement is performed for at least one signal strength indicator an averaging may be performed to determine the first signal strength indicator and/or the second signal strength indicator. Thus, averaged or mean signal strength indicators may be used for determining the control signal.

According to another exemplary embodiment the method further comprises amplifying at least one of the first and the second data signals before measuring the signal strength indicator.

In particular, the amplifying may be performed by a low noise amplifier. Such an amplification may be in particular useful in case of the tuning of a receiving antenna, e.g. during a receive mode.

According to another exemplary embodiment of the method at least one of the first and the second data signals comprises symbols having a predetermined timing, and wherein the measuring of the first signal strength indicator and/or of the second signal strength indicator is synchronized with the predetermined timing.

According to another exemplary embodiment of the method the signal strength indicator relates to an amplitude of the data signal.

According to another exemplary embodiment of the method the signal strength indicator relates to a current consumption of a device the antenna is part of.

In general, the signal strength indicator may relate to different measurable parameters, like current consumption, e.g. the supply current, and/or may relate to an amplitude response on the antenna and/or may be determined based on an FFT of an information signal.

According to another exemplary embodiment of the method the tuning is performed by tuning a capacity of the antenna is part of.

According to another exemplary embodiment of the method the first signal strength indicator and/or the second signal strength indicator each relates to more than one data signal.

In particular, a measurement of the signal strength indicators may be performed by measurements on several symbols of the same type. Thus, it may be possible to increase the signal to noise ratio, e.g. of the signal strength indicators.

According to another exemplary embodiment the method further comprises receiving a third signal strength indicator indicating a signal strength of a third data signal transmitted by the antenna on a third frequency different to the first frequency and the second frequency, wherein the control signal is determined based on the first, the second and the third signal strength indicators. In particular, the third frequency may be the carrier frequency.

By receiving, measuring or generating a third signal strength indicator it may be possible to provide a bandwidth tuning in an efficient way, e.g. in the case that the first frequency corresponds to the lower FSK tone (F0), the second frequency corresponds to the higher FSK tone (F1) and the third frequency corresponds to the carrier frequency. The three signal strength indicators may be used to determine the control single either in a single step, i.e. using all three indicators together, or in an iterative way, i.e. first using the first and the second indicator in a first step and then in an iterative second step using the third indicator and at least one of the first and the second indicator.

According to another exemplary embodiment of the method for transmission of data signals a protocol is used which is based on a slotted access, and wherein the first data signal and/or the second data signal is transmitted during a predetermined time slot.

In particular, such a protocol may define a superframe, like in a TDMA scheme. A superframe may contain seven slots, wherein six slots, which may be called SCHx are slots which are reserved before being used by any device, e.g. for transmitting payload, while the seventh slot is a so-called RCH slot which may be accessed by any device and may be used to exchange protocol/control related information between devices among with reservation of SCH slots for allocation of bandwidth. That is, the RCH slot may also be called a protocol/control slot. In particular, the tuning process, e.g. the determining of the control signal may be extended over more than one time slot, e.g. may be spread over more than one superframe.

In order to avoid any loss of data exchange between devices, the tuning may be performed after a frame synchronisation time-out, e.g. between end of a synchronisation window and end of a communication slot. In particular, the signal strength indicator (RSSI) may be checked before any signal measurement on the tank in order to avoid measuring in presence of interference, e.g. $RSSI_{RF}$ should be below a defined threshold.

According to another exemplary embodiment of the method the predetermined time slot is an RCH slot.

In particular, RCH slots may be used where no payload data are transmitted or received. Thus, it may be possible to perform tuning of the antenna without decreasing the usable bandwidth.

According to another exemplary embodiment of the method the first data signal and/or the second data signal is a specific tune signal.

In particular, during the respective time slot, the system/device or radio may be configured in tuning mode. Test signals at relatively low level may be transmitted and the resulting signal amplitude may be measured by a measuring unit adapted to measure the received strength indicator.

According to another exemplary embodiment of the method the receiving, the determining and the tuning steps are repeated until a predetermined tuning level is achieved. That is, an iterative processing may be implemented in order to achieve a desired or optimal tuning level. The iterative processing may be either done by using the same frequencies for each iterating step or using different frequencies for each iterating step.

Summarizing according to a first exemplary aspect of the invention a mechanism may be provided to dynamically tune an antenna of a transceiver, e.g. modem, and that is applicable to different modulation types by using the difference of signal strength indicators measured at different frequencies. The tuning may happen during transmission and reception of signal, i.e. during operation. The technique may be implemented entirely in hardware or software, or a combination of both. In particular, the technique may not require a balanced modulating bit stream, i.e. an equal number of zeros and ones. It may therefore be independent of the transmitted bit stream to a large extent. This may be a major advantage of this technique. Furthermore, it may be applied any time during transmission and/or reception of a signal. It should be noted that in case of an FSK modulation and in transmitting (TX) mode, instead of the amplitude of the signal on the coil (antenna) tank, it may also be possible to measure the current consumption on the supply. Indeed, the current consumption may follow the same curve as the amplitude of the signal. In that case, the signal strength indicator may be measured by a current meter on the supply. So the signal strength indicator or signal signature (symbol dependent) is either the voltage on the coil or the current on the supply.

Summarizing according to a second exemplary aspect of the invention a method is provided which assumes that a protocol used to exchange information between system/devices, e.g. MI radios, is based on a slotted access (in the time domain). In such a scheme, devices from a network may access and may use the common communication medium at defined moments in the time, called time slots. Example of such protocols may be TDMA, for example used in GSM networks, or slotted Aloha. The antenna tuning status may be regularly checked during time slots where the IC is neither transmitting nor receiving information, wherein the tuning principle may be based on the above described first exemplary aspect of the invention. Also when using a method according to the second exemplary aspect of the invention a mechanism may be provided adapted to dynamically tune the antenna of a transceiver (modem) and that is applicable to different modulation types. Dynamically tuning may particularly mean a tuning during a communication. The technique may be applicable to communication systems which use a protocol based on a slotted access (in the time domain) and where the channel bandwidth is not used 100% of the time. Furthermore, the described technique may not imply a decrease of available bandwidth, since it may only consume bandwidth when it is available. The method may be a self tuning method, i.e. a measurement of response to stimuli on the antenna may be performed and may be applied any time during transmission and/or reception of signal.

Alternatively to the use of two specific tones or data signals, e.g. F0 and F1 signals in case of an FSK modulation, it may be possible to use the signal itself, i.e. the "normal" information signal, conveying information from transmitter to receiver. That is, the signal strength indicator may indicate the strength of the information signal itself. In that case two cases should be distinguished. A first case relates to the TX mode in which case a current consumption on a supply or the signal amplitude on the antenna may be used for achieving the signal strength indicator. A second case relates to the RX mode in which case a detected symbol may be used to achieve the signal strength indicator, e.g. by a mapping between a symbol type and the signal strength indicator by using a decision feedback mechanism, for example.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
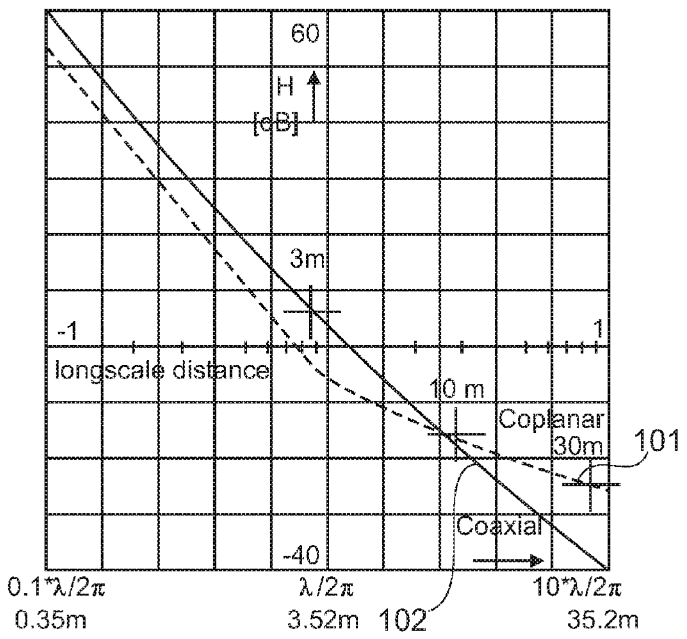
FIG. 1 schematically illustrates a course of an H field versus distance.

The illustration in the drawing is schematically. In different drawings, similar or identical elements are provided with similar or identical reference signs.

FIG. 1 schematically shows an H field from a current loop at 13.5 MHz, versus distance. In particular, FIG. 1 shows the H field for the coplanar case 101 and the coaxial case 102 in a double logarithmic diagram.

Figure 2:
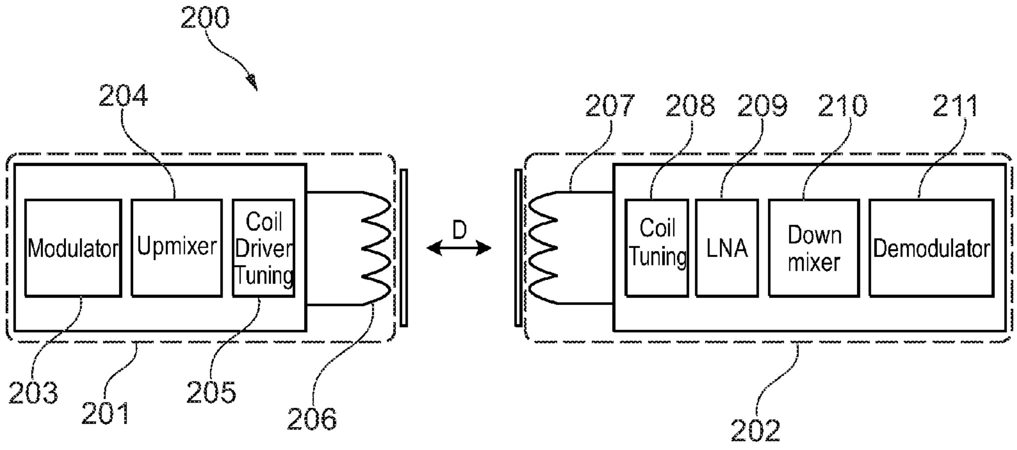
FIG. 2 schematically illustrates a system according to an exemplary embodiment.

FIG. 2 schematically illustrates a system according to an exemplary embodiment. The system 200 comprises a transmitter 201 and a receiver 202, both of which may also be called a transducer. Like common RF systems the transmitter 201 comprises a modulator block 203, an optional mixer to shift a signal around the carrier frequency ($F_c$), and a coil driver module 205, e.g. an LC circuit tuned at $F_c$. Furthermore, the transmitter 201 comprises a coil 206 so that a wireless transmission, e.g. by near-field propagation mechanism, is enabled. Furthermore, the receiver 202 comprises a coil 207 as well, which may form a transformer together with the coil 206 of the transmitter 201, i.e. which may provide a loose coupling. The two coils may comprise a core, e.g. a ferrite core, in order to increase link efficiency. The receiver 202 further comprises a front end comprising a circuit (LC) 208 tuned at the central frequency, an amplifier 209, e.g. a low noise amplifier, a mixer 210 for mixing down the received signal, and a demodulator 211.

The system shown in FIG. 2 may operate around a carrier frequency (Fc) and uses a modulated signal to transmit the data. In particular, a FSK modulated signal with a bandwidth of about 600 kHz (B) around 13.5 MHz may be used, having a modulation index of 1.0 and a modulation rate of 298 kbps.

In the following the basic principle of a method and a system according to a first exemplary embodiment will be described. In general the principle consist of measuring the antenna amplitude response according to the transmitted or received symbol and align the antenna accordingly. The principle is depicted hereunder for TX and RX mode.

Figure 3:
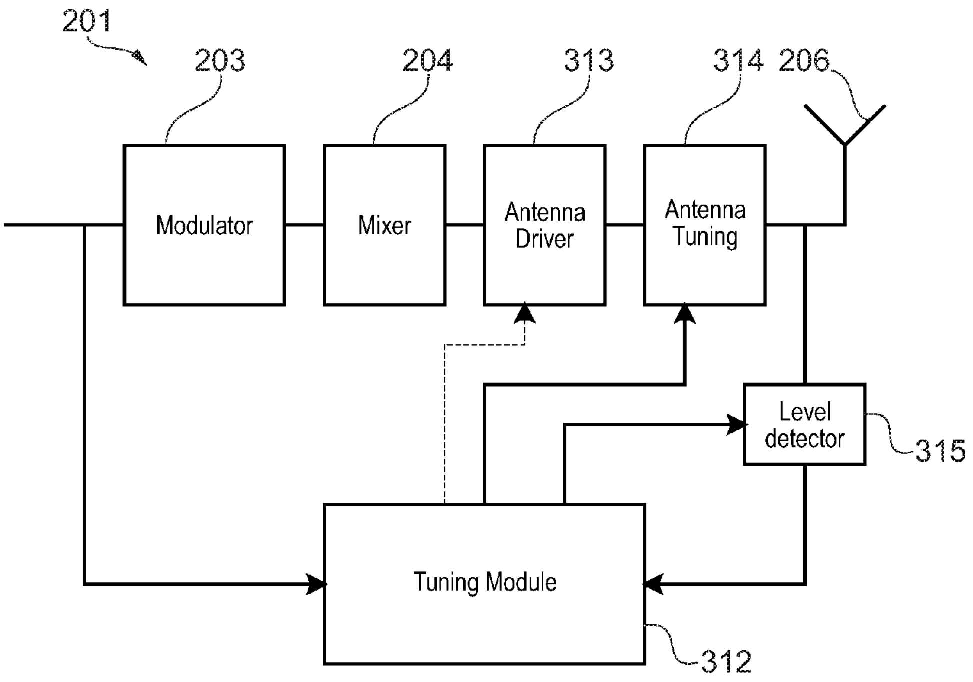
FIG. 3 schematically illustrates a tuning technique principle in transmission mode.

In particular, FIG. 3 illustrates the tuning technique principle in TX, i.e. illustrates the transmitter 201 in greater detail. Beside the modulator 203, the mixer 204, and the coil or antenna 206, the transmitter 201 comprises a tuning module or determination unit 312, an antenna driver module 313, an antenna tuning module 314, and a level detector 315. The level detector 315 is adapted to measure the level, e.g. amplitude level, of a signal passed to the coil 206 and provides the same to the tuning module 312. Out of this signal level and the original unmodulated signal the tuning module 312 generates control signals which are sent to the antenna driver module 313, the antenna tuning module 314 and the level detector 315. The control signals may be different for all of the modules. It should be noted that in TX mode, the tuning module may be associated with a drive level calibration into a single module.

Figure 4:
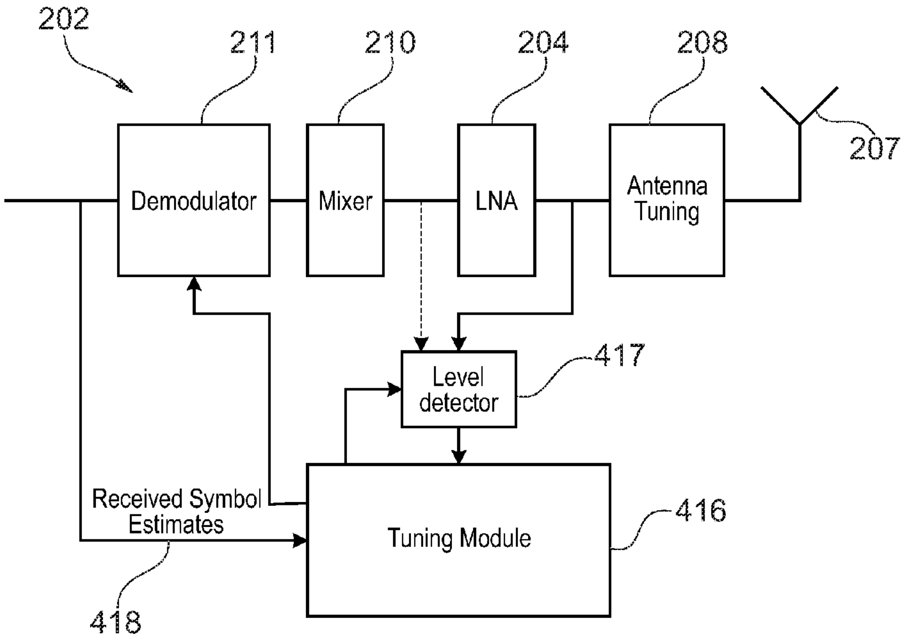
FIG. 4 schematically illustrates a tuning technique principle in receiving mode.

In particular, FIG. 4 illustrates the tuning technique principle in RX, i.e. illustrates the receiver 202 in greater detail. Beside the demodulator 211, the mixer 210, the amplifier 209, the antenna tuning circuit or module 208, and the coil or antenna 207, the receiver 202 comprises a tuning module or determination unit 416 and a level detetcor 417. A signal is received by the antenna 207 and processed by the antenna tuning module 208. The processed signal is then fed into the level detector 417 to measure a signal strength. Optinally an amplified signal may be fed into the level detector 417. That is, in receive mode the signal level can be measured before or after the LNA. The signal strength or signal level is then input in the tuning module 416 which then generate control signals which are input into the demodulator 211 and the level detector. For the generation of the control signals symbol estimates may also be considered which is indicated by the line 418. In RX mode, information about detuning from the tuning module may be exploited by the demodulator to improve symbol estimates Preferably, the level measurements is synchronized with the symbol timing in order to interprete correctly each measurement.

The process to drive the tuning based on symbol types and the signal level measurement on the antenna may of course depend on the modulation type. For example, for OOK (On-OFF keying) modulation, the technique will consist of discarding any measurement on '0' bits, and tune the antenna until the signal amplitude on the antenna is maximum during '1' bits. For FSK modulation, the technique will consist of measuring signal strength during '0' bits and '1' bits separately, and tune the antenna such that the level is of equal amplitude (or the difference minimized) on both FSK tones. For more accurate measurements, measurement on several symbols of the same type may be performed for better performance in noise In the following, an example based on a tuning process for FSK modulation is described. The principle is illustrated in the case of an FSK transceiver and may consist of measuring the signal amplitude on the antenna at a first frequency F0, i.e. the lower FSK tone, and on a second frequency F1, i.e. the upper FSK tone, and calculating the amplitude difference, i.e. amplitude on F0—amplitude on F1. Ideally this difference is 0 while optimally tuned, negative when the resonant frequency is too high, and positive when the resonant frequency is too low. Thus, the sign of the amplitude difference indicates directly the tuning direction.

Figure 5:
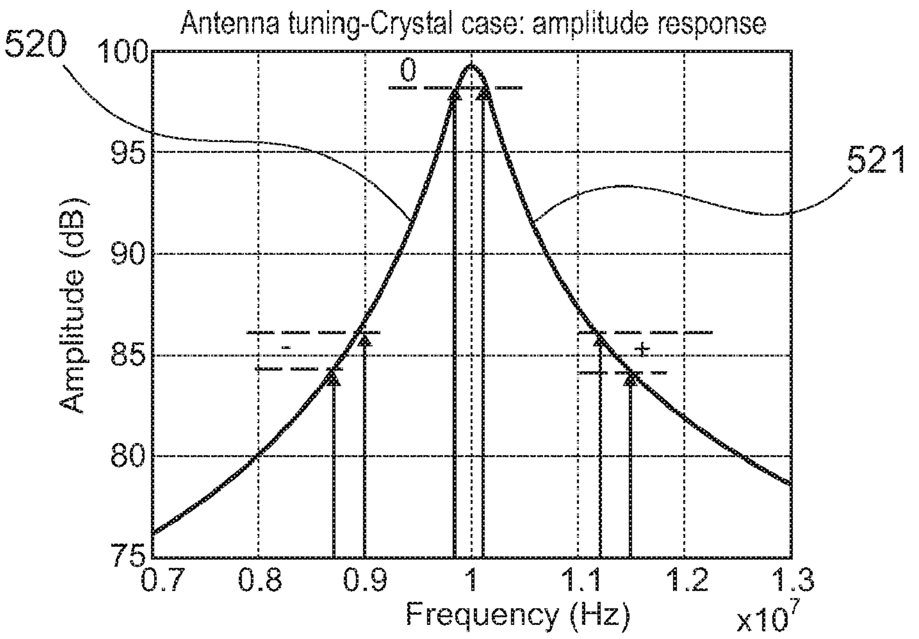
FIG. 5 schematically illustrates measures signal amplitudes.
Figure 6:
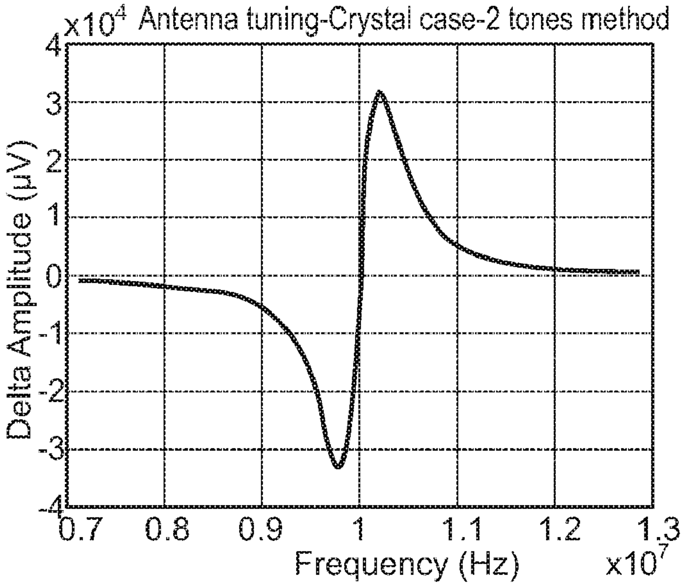
FIG. 6 schematically illustrates amplitude differences.

In FIG. 5 the amplitude in dB versus the frequency in $10^7$ Hz offset is depicted, while FIG. 6 directly shows an example of the amplitude difference in μV versus the frequency. In general, for the tuning process the tuning capacitor setting for which the amplitude difference between tones F0 and F1 is closest to 0 is sought for. As can be seen in both figures a negative difference, corresponding to the left part 520 of the graph in FIG. 5, indicates that the resonant frequency is too high, while a positive difference, corresponding to the right part 521 in FIG. 5, indicates that the resonant frequency is too low.

In the following a method according to a second embodiment is described. This second method assumes that the protocol used to exchange information between MI radios (Modulation Index) is based on a slotted access (in the time domain). In such a scheme, devices from a network access and use the common communication medium at defined moments in the time, called time slots. Example of such protocols is TDMA (used in GSM networks for example) or slotted Aloha. So any receiver knows when a frame may be expected from another node of the network. Preferably, the antenna tuning status is checked regularly during time slots where the MI radio or IC is neither transmitting nor receiving information.

Figure 7:
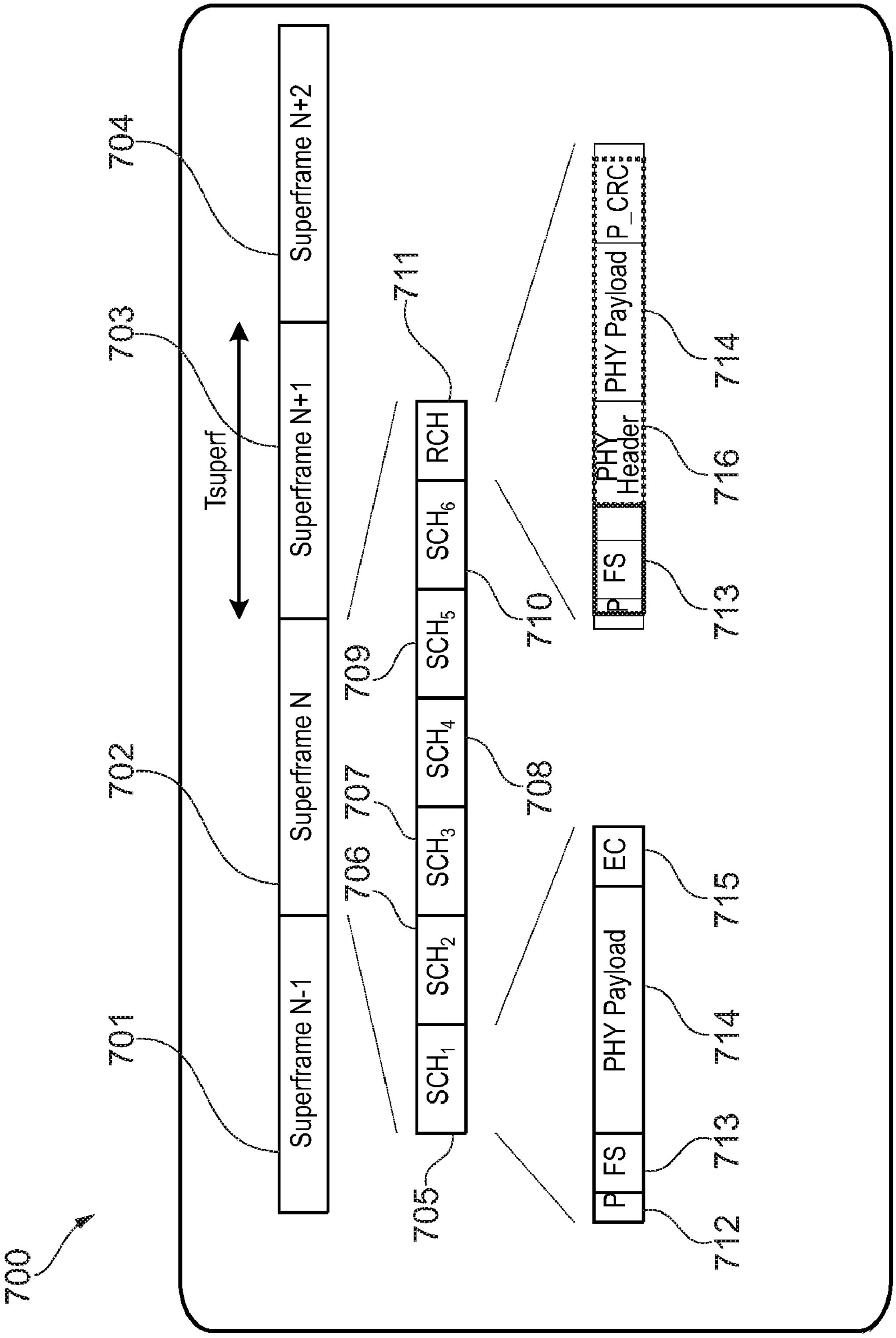
FIG. 7 schematically illustrates a slotted transmission scheme.

Such a TDMA scheme 700 is schematically shown in FIG. 7 and is based on the repetition of a superframe 701, 702, 703, and 704. Each superframe contains 7 slots: six slots called SCHx 705, 706, 707, 708, 709, 710, and one slot called RCH 711, wherein SCHx slots must be reserved before being used by any device while RCH slot can be accessed by any device (on a collision/contention base). RCH is used to exchange protocol/control related information between devices, among with reservation of SCH slots for guaranteed allocation of bandwidth. A SCH slot may comprise a preamble 712, a frame synchronisation word 713, PHY payload 714, and a RS FEC portion 715, while an RCH slot may additionally comprise a PHY header 716 which may be used for the tuning process.

According to this exemplary embodiment tuning takes place in RCH time slot when no information has to be sent in that slot, and no frame has been detected (RX mode).

According to the second exemplary embodiment antenna quality (Q) tuning is preferably applied after antenna resonance frequency tuning. The tuning principle is basically the same as according to the first exemplary embodiment. However, specific tune signals may be used and the time at which measurements are performed may differ.

A single measurement (either on Fc, F0 or F1) is taken by superframe during the last slot (7th) provided there is no packet to be send or no frame synchronizing occurred. So the antenna measurement may not performed until the antenna is correctly tuned, measurements/corrections are spread over multiple superframes. At each measurement, the amplitudes are compared and the capacity (C) settings are adjusted accordingly, e.g. in case the difference is negative C is decreased while in case that the difference is positive C is increased. This may mean that unless difference is ideally 0, a toggling between two C settings may occur (+−+−+− . . . ). According to this method, there may be more time to measure signal strength so that the number of samples averaged may be increased:

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word “comprising” and “comprises”, and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of tuning an antenna, the method comprising:
receiving a first signal strength indicator indicating a signal strength of a first data signal transmitted by an antenna on a first frequency,
receiving a second signal strength indicator indicating a signal strength of a second data signal transmitted by the antenna on a second frequency different from the first frequency,
determining a tuning control signal based on the first signal strength indicator and the second signal strength indicator, wherein the tuning control signal is based on a difference between the first signal strength indicator and the second signal strength indicator, wherein the difference between the first signal strength indicator and the second signal strength indicator is found by subtracting the first signal strength indicator from the second signal strength indicator, and
tuning the antenna based on the tuning control signal.

2. The method according to claim 1, further comprising:
measuring the first signal strength indicator, and
measuring the second signal strength indicator.

3. The method according to claim 2, further comprising:
amplifying at least one of the first and the second data signals before measuring the signal strength indicator.

4. The method according to claim 2,
wherein at least one of the first and the second data signals comprises a plurality of symbols having a predetermined timing, and
wherein the measuring of at least one of the first signal strength indicator and the second signal strength indicator is synchronized with the predetermined timing.

5. The method according to claim 1,
wherein the signal strength indicator relates to an amplitude of the data signal.

6. The method according to claim 1,
wherein the signal strength indicator relates to a current consumption of a device which includes the antenna.

7. The method according to claim 1, wherein the tuning is performed by tuning a capacity of the antenna.

8. The method according to claim 1, wherein at least one of the first signal strength indicator and the second signal strength indicator relates to more than one data signal.

9. The method according to claim 1, further comprising:

receiving a third signal strength indicator indicating a signal strength of a third data signal transmitted by the antenna on a third frequency different from the first frequency and the second frequency, wherein the control signal is determined based on the first, the second and the third signal strength indicators.

10. The method according to claim 1, wherein for transmission of data signals a protocol is used which is based on a slotted access, and wherein at least one of the first data signal and the second data signal is transmitted during a predetermined time slot.

11. The method according to claim 10, wherein the predetermined time slot is an RCH slot.

12. The method according to claim 10, wherein at least one of the first data signal and the second data signal is a specific tune signal.

13. A non-transitory program element, which, when executed by a processor, implements a method according to claim 1.

14. A computer-readable medium, in which a computer program is stored which, when being executed by a processor, is adapted to control or carry out a method according to claim 1.

15. The method according to claim 1, wherein a negative difference between the first signal strength indicator and the second signal strength indicator indicates a resonant frequency of the antenna is too high and a positive difference between the first signal strength indicator and the second signal strength indicator indicates that the resonant frequency is too low.

16. The method according to claim 1, wherein in case the difference between the first signal strength indicator and the second signal strength indicator is negative, capacity of the antenna is decreased, and in case the difference between the first signal strength indicator and the second signal strength indicator is positive, capacity of the antenna is increased.

17. A system for tuning an antenna, the system comprising:

a transducer having:

a receiving terminal, adapted to receive a first signal strength indicator indicating a signal strength of a first data signal transmitted by an antenna on a first frequency, and further adapted to receive a second signal strength indicator indicating a signal strength of a second data signal transmitted by the antenna on a second frequency different from the first frequency, a determining unit adapted to determine a tuning control signal based on a difference between the first signal strength indicator and the second signal strength indicator, wherein the difference between the first signal strength indicator and the second signal strength indicator is found by subtracting the first signal strength indicator from the second signal strength indicator, and a tuning unit adapted to tune the antenna based on the tuning control signal.

18. The system according to claim 17, wherein a negative difference between the first signal strength indicator and the second signal strength indicator indicates a resonant frequency of the antenna is too high and a positive difference between the first signal strength indicator and the second signal strength indicator indicates that the resonant frequency is too low.

19. The system according to claim 17, wherein in case the difference between the first signal strength indicator and the second signal strength indicator is negative, capacity of the antenna is decreased, and in case the difference between the first signal strength indicator and the second signal strength indicator is positive, capacity of the antenna is increased.

* * * * *